United States Patent [19]

Moschopoulos

[11] 4,447,741
[45] May 8, 1984

[54] BASE DRIVE CIRCUIT FOR POWER TRANSISTORS

[75] Inventor: Anastasios Moschopoulos, Montreal, Canada

[73] Assignee: Northern Telecom Limited, Montreal, Canada

[21] Appl. No.: 424,087

[22] Filed: Sep. 27, 1982

[51] Int. Cl.³ .......................... H02M 7/00; G05F 5/00
[52] U.S. Cl. ...................................... 307/31; 307/17; 307/83; 323/289; 363/21; 363/71
[58] Field of Search .................. 307/17, 18, 31, 52, 307/83; 323/289; 363/17, 20, 21, 71, 98, 132

[56] References Cited

U.S. PATENT DOCUMENTS

| | | | |
|---|---|---|---|
| 3,927,365 | 12/1975 | Kodama et al. | 307/17 X |
| 4,055,790 | 10/1977 | Gerding et al. | 307/31 X |
| 4,195,333 | 3/1980 | Hedil | 363/21 |
| 4,313,155 | 1/1982 | Bock et al. | 363/71 X |

Primary Examiner—E. A. Goldberg
Assistant Examiner—Derek Jennings
Attorney, Agent, or Firm—Sidney T. Jelly

[57] ABSTRACT

A base drive circuit for power transistors uses a base drive transformer in a dual mode, as a voltage transformer when it is driven to switch on or off, and as a circuit transformer when the transistor is conducting. Particularly a single base drive is used to drive a plurality of base drive transformer, each base drive transformer acting in the dual mode. This isolates the power transistors from each other and avoids differences in switching characteristics of the power transistors from affecting each other.

3 Claims, 7 Drawing Figures

BASE DRIVE CIRCUIT FOR POWER TRANSISTORS

This invention relates to a base drive circuit for power transistors. Particularly, the invention is concerned with the correct functioning of power transistors, in an efficient and reliable manner, and yet can be cost effective. The invention is particularly applicable to the control of a number of power transistors, by a common base drive, and to effect switching of transistors in unison.

The speed of switching of power transistors affects the efficiency of such transistors. Further, when power transistors are used in a parallel arrangement and required to switch simultaneously, the characteristics of individual transistors, which can vary from one transistor to another, can result in one transistor not being fully switched by the time another transistor is. This can result in heavy power loads acting on the partially switched transistor, causing burnout.

In its broadest aspect, the invention provides a base drive to a power transistor by using the base drive transformer in a dual mode, the transformer operated as a voltage transformer when it is driven to switch on or off, and as a current transformer when the power transistor is conducting.

In a more specific aspect of the invention, a single base drive is used to drive a plurality of base drive transformers, each base drive transformer operating in the manner described above. By this means each power transistor is isolated from the others and the differences in switching characteristics of one will not affect the others.

The invention will be readily understood by the following description of certain embodiments, by way of example, in conjunction with the accompanying drawings, in which.

Figure 1:
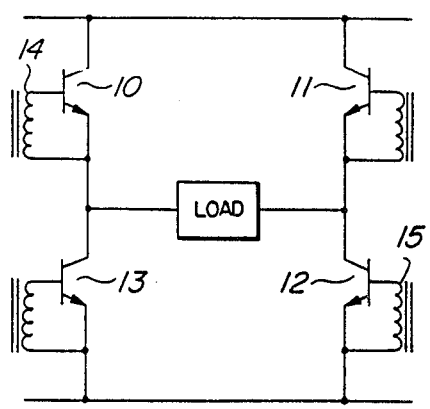
FIG. 1 is a diagrammatic circuit of a conventional bridge, using power transistors.

FIG. 1 is a diagramatic illustration of a bridge, with four power transistors 10, 11, 12 and 13. A base drive transformer drives both transistors 10 and 12, the winding being in two parts, indicated at 14 and 15. A further transformer will have two parts to drive transistors 11 and 13. The problems with the arrangement of FIG. 1 is that variations in switching characteristics of transistors 10 and 12 can cause the switching speed of one to be slightly slower than the other. Thus, if transistor 10 is fully switched when transistor 12 is only partially switched, very high power levels can be applied to transistor 12 causing it to fail. A similar situation can apply to transistors 11 and 13.

Figure 2:
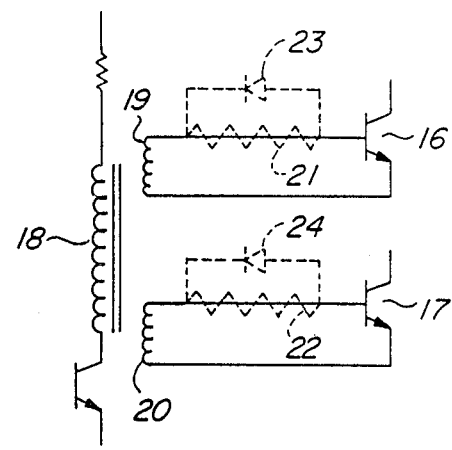
FIG. 2 is a diagrammatic arrangement of a typical conventional base drive arrangement for power transistors in parallel.

FIG. 2 illustrates two power transistors 16 and 17 intended to be switched simultaneously by base drive transformer 18. This diagrammatic circuit, to some extent, illustrates the two transistors 10 and 12 of FIG. 1. The transistors 16 and 17 are each driven by parts of the transformer winding indicated at 19 and 20. The problem of switching transistors 16 and 17 is the same as for the transistor 10 and 12, in that variation of the switching characteristics of one transistor relative to the other results in different switching speeds.

Various attempts at equalizing switching characteristics have been made. Thus, as indicated in FIG. 2, a resistor 21 and 22 has been placed in the conductor from transformer to transistor for each transistor. The intent is that as the voltage increases in the conductor, the resistor effect increases. There is an attempt to equalize voltage increases by this, as if the voltage to transistor 16 increases faster than to transistor 17, resistor 21 has a greater effect than resistor 22. A further feature is the addition of a diode 23, 24 across the resistors 21, 22. However, these extra components add cost and increase the conductor length between transformer and transistor. This introduces inductance, which slows down switching speed and can also result in an extra pulse being applied to the transistor, which is productive of inefficiency. There then results an arrangement which is more costly, less efficient with only a partial solution of the basic problem of differential switching speeds.

Figure 3:
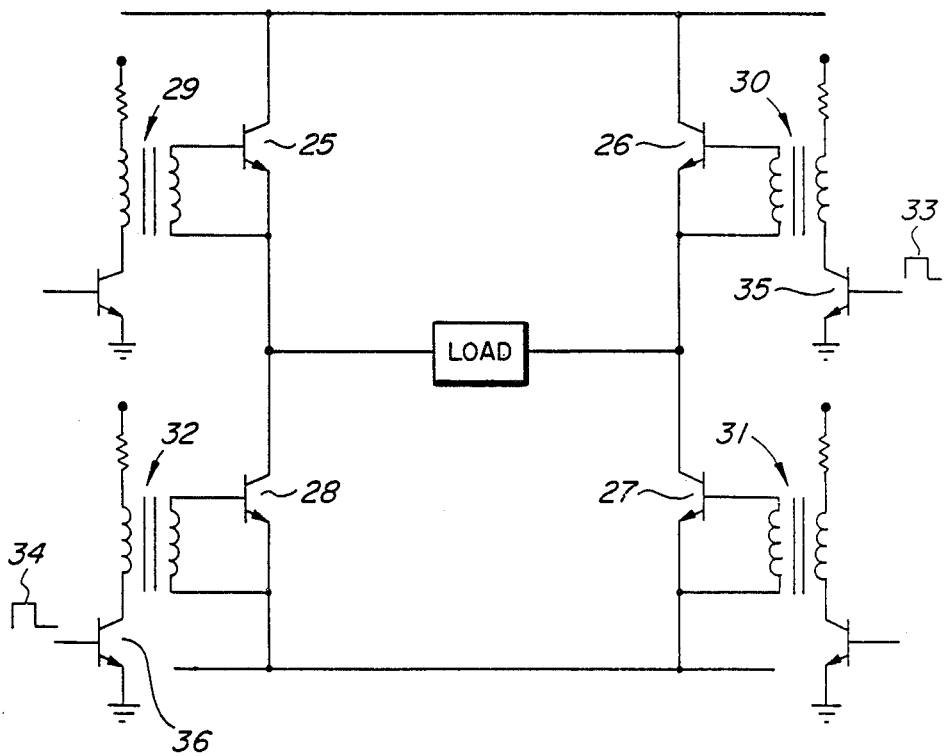
FIG. 3 is a diagrammatic circuit of another conventional arrangement for base drive of multiple power transistors.

FIG. 3 illustrates a further known arrangement of power transistors, indicated at 25, 26, 27 and 28, each transistor driven by its own base drive transformer 29, 30, 31 and 32. It is designed to switch transistors 26 and 28 simultaneously, by a pulse applied separately to each transformer 30 and 32, the pulse signal indicated at 33 and 34. The pulses 33 and 34 are applied to the transformer via semiconductor switches, indicated at 35 and 36. These semiconductor switches can be a power FET, or a transistor, although a transistor requires higher switching power. For a system in which the semiconductor switches receive data pulses from a logic circuit, low power switches are desired.

The problem with the arrangement of FIG. 3 is that even with the same switching characteristics for transistors 26 and 28, slight time variations in the pulses arriving at switches 35 and 36 results in non-synchronous switching. Variations in switching characteristics create switching problems, as previously described, even if the pulses are both applied simultaneously. Variation in pulse timing and switching characteristics can become additive to further reduce the efficiency.

Figures 4, 5:
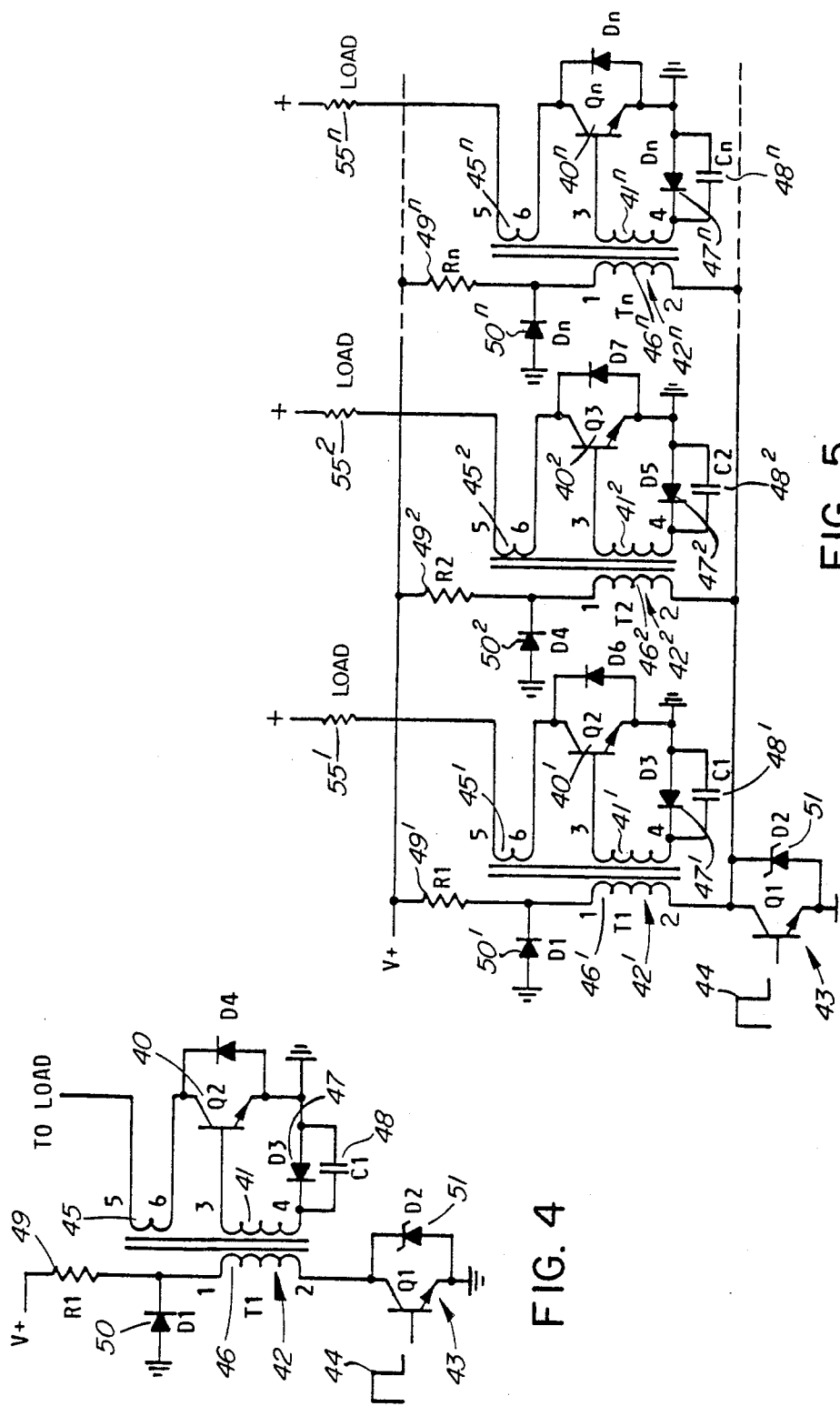
FIG. 4 is a circuit illustrating the broad concept of the present invention.
FIG. 5 is a circuit illustrating the application of the broad concept to drive a number of power transistors from a single base drive.

FIG. 4 illustrates a basic circuit, in accordance with the present invention. The circuit illustrated is a proportional drive circuit that provides efficient base drive with a rapid switching. A power transistor is indicated at 40 and has a base drive from transformer winding 41. The base drive circuit prevents false triggering of the transistor 40 during its OFF time by driving the base drive transformer 42 to saturation, and holding it saturated by the base drive means 43. Base drive means 43 is a semiconductor switch and can be a power FET or a transistor, for example. The power transistor 40 is initially switched ON when switch 43 turns off, in response to a signal indicated at 44, and is held ON by the circuit indicated in winding 41 by the circuit feedback winding 45. This current is proportional to the current flow through winding 45 and the turns ratio of windings 41 and 45.

At the end of the duty cycle, which is controlled by the control circuit, i.e., by a further signal to switch 43, switch 43 switches ON and a negative bias is applied to the base of power transistor 40 until transformer 42 goes into saturation; the initial negative bias ensures a fast turn off time for transistor 40 and the voltage level is proportional to the voltage applied to winding 46 and the ratio of windings 46 and 41.

The network comprising diode 47 and capacitor 48 is to accelerate the turn OFF of transistor 40. Resistor 49 is to limit the current flow to winding 46 when the transformer 42 saturates. Diode 50 provides a low impedance return when the switch 43 switches OFF and diode 51 is to protect switch 43.

FIG. 5 illustrates the application of the basic circuit of FIG. 4 to an arrangement in which one driver, or switch, can be used to drive a plurality of power transistors. In the circuit of FIG. 5, similar reference numerals are used for similar details, relative to FIG. 4, but primed. Thus, a single driver, or semiconductor switch 43, controls a plurality of power transistors $40^1$, $40^2$, $40^n$ via the base drive transformers $42^1$, $42^2$, $42^n$. The advantage of this circuit is that each power transistor is isolated from the other, and the difference in the switching characteristics of one power transistor would not affect the operation of the others. The load associated with each power transistor is exemplified by resistors $55^1$, $55^2$ and $55^n$. The loads can be inductive or resistive.

Figure 6:
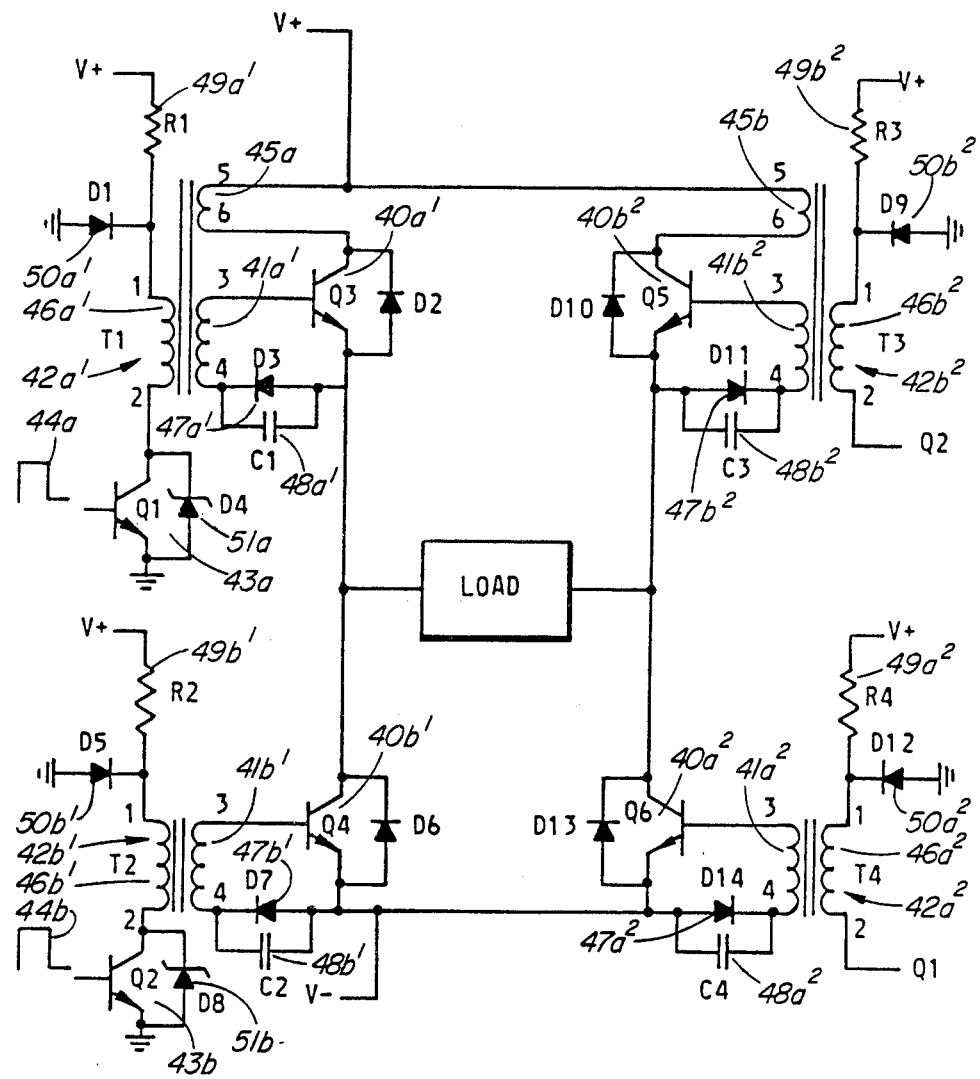
FIG. 6 is a circuit illustrating the application of the broad concept to switch power transistors simultaneously by a single base drive.

FIG. 6 illustrates a bridge circuit in which two drivers are provided, each driver arranged to drive two power transistors. This is somewhat as in FIG. 1 or FIG. 3, but avoids the disadvantages associated with the arrangements illustrated in those figures and described previously. In FIG. 6, references are used which correspond to those used in FIG. 4, with suffixes and primes to indicate individual components.

Thus, for example, driver, or switch 43a, drives power transistors $40a^1$ and $40a^2$ via base drive transformers $42a^1$ and $42b^1$. Other components common with the circuit of FIG. 4 are identified by similar references. This circuit has the same advantage as that of FIG. 5 in that each power transistor is isolated from the others and therefore differences in switching characteristics do not affect the operation of the power transistors.

Each power transistor in each of the circuits of FIGS. 5 and 6 have high efficiency provided by the circuit of FIG. 4. The proportional base drive gives rapid and highly efficient switching. A further advantage of the arrangement of FIG. 4 is that the base current is in phase with the collector current and this provides an extra benefit.

Figure 7:
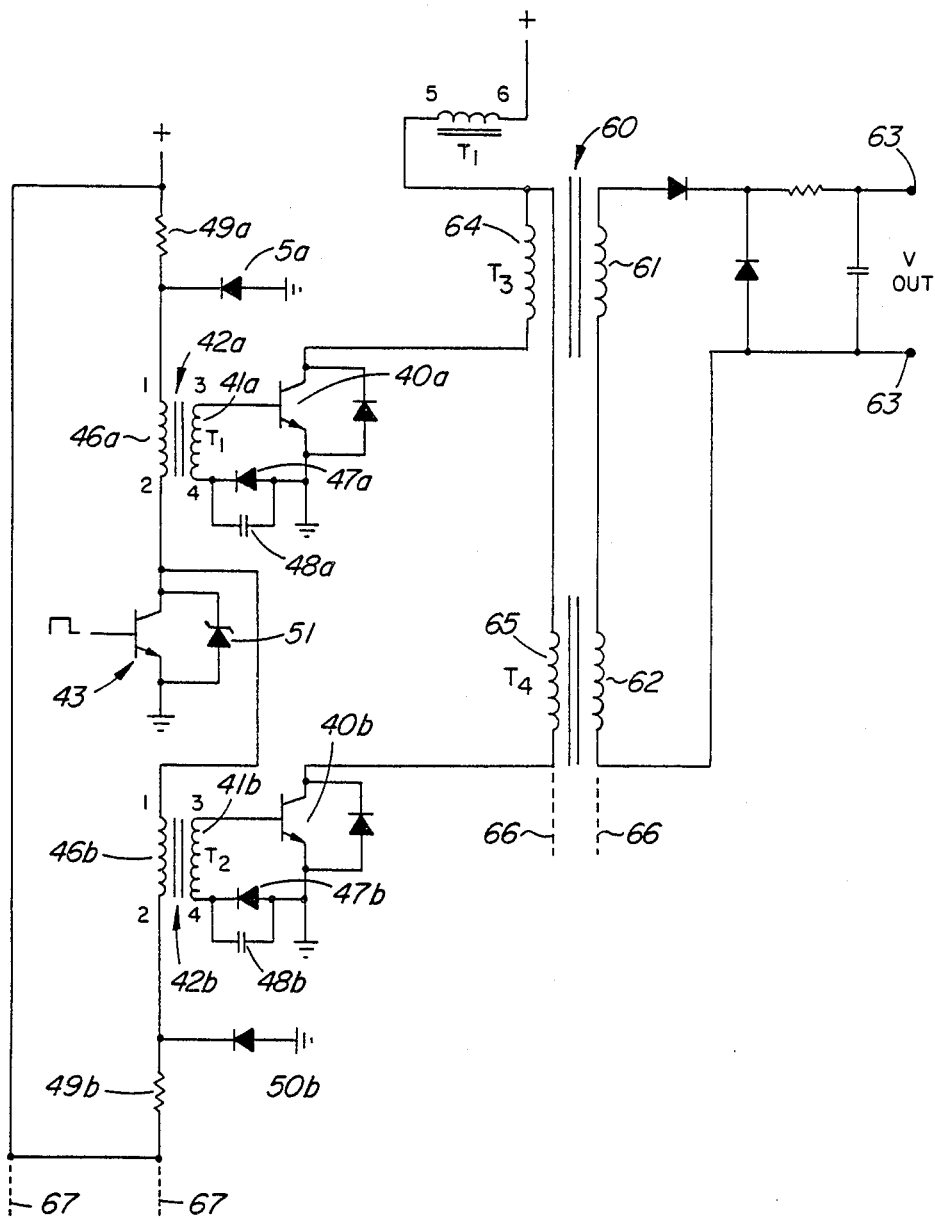
FIG. 7 is a circuit illustrating the application of the invention for switching power tranformers.

FIG. 7 illustrates the application of the invention to the switching of power transformers. Two power transformers are indicated generally at 60, with an output −V out—appearing from primary windings 61 and 62, at output terminals 63. The secondary windings 64 and 65 are switched on and off by the power transistors 40a and 40b, driven by base drive transformers 42a and 42b. The same reference numerals are used in FIG. 7 as are used for the same items in FIGS. 4 to 6, with suffixes to relate to either power transistor 40a or power transistor 40b.

The two power transistors 40a and 40b are driven, via the base drive transformers 42a and 42b, by the single driver 43. The power at the output terminals 63 is increased by having the two secondary portions T3 and T4. It is possible to add further power transformers, with their associated power transistors driven by the one driver, as indicated by the dotted conductor extensions indicated at 66 and 67. An output pulse will be obtained for each pulse input to the driver 43.

It is possible to increase the frequency of the output pulses by providing a second power transformer and associated power transistor and driver circuit, for example, a repeat basically of the circuit of FIG. 7, and connecting the outputs of the two power transformers. The pulse input to the second driver will be out of phase with the input pulse to the first driver, for example by 180°.

What is claimed is:

1. A base drive circuit for power transistors, comprising:
   a power transistor;
   a base drive transformer for said power transistor, connected to operate in a dual mode as a voltage transformer when in a switching condition and as a circuit transformer when said power transistor is conducting, said transformer including a primary winding and two secondary windings, one secondary winding connected at one end to the base of the power transistor and connected at the other end to a ground, and including a network between said other end and ground, said network including a diode and a capacitor in parallel to accelerate the turn off of the power transistor, the other secondary winding connected between the transistor and a load;
   base drive means for driving said base drive transformer, said base drive means comprising a semiconductor switch and means for applying control pulses to said switch, said primary winding connected to said switch.

2. A base drive circuit as claimed in claim 1, said primary winding connected at one end to said switch and including a diode connected between the other end of said primary winding and a ground, to provide a low impedance return when said semi-conductor switch switches off.

3. A base drive circuit as claimed in claim 1, including a plurality of power transistors, a plurality of said base drive transformers, a transformer for each power transistor, and a single base drive means for driving each base drive transformer, the primary winding of each transformer connected to said semiconductor switch of said base drive means.

* * * * *